(12) United States Patent
Ferreira Moreno et al.

(10) Patent No.: US 11,875,550 B2
(45) Date of Patent: Jan. 16, 2024

(54) SPATIOTEMPORAL SEQUENCES OF CONTENT

(71) Applicant: International Business Machines Corporation, Armonk, NY (US)

(72) Inventors: Marcio Ferreira Moreno, Rio de Janeiro (BR); Rafael Rossi de Mello Brandao, Rio de Janeiro (BR); Guilherme Augusto Ferreira Lima, Campinas (BR)

(73) Assignee: International Business Machines Corporation, Armonk, NY (US)

( * ) Notice: Subject to any disclaimer, the term of this patent is extended or adjusted under 35 U.S.C. 154(b) by 158 days.

(21) Appl. No.: 17/126,765

(22) Filed: Dec. 18, 2020

(65) Prior Publication Data

US 2022/0198211 A1 Jun. 23, 2022

(51) Int. Cl.
*G06F 16/732* (2019.01)
*G06F 16/9535* (2019.01)
(Continued)

(52) U.S. Cl.
CPC .......... *G06V 10/464* (2022.01); *G06F 16/483* (2019.01); *G06F 16/71* (2019.01);
(Continued)

(58) Field of Classification Search
CPC .... G06V 10/464; G06V 10/70; G06V 10/764; G06F 16/783; G06F 16/483; G06F 16/71;
(Continued)

(56) References Cited

U.S. PATENT DOCUMENTS 7,835,578 B2 11/2010 Cheng et al.
8,275,649 B2 9/2012 Zheng et al.
(Continued)

FOREIGN PATENT DOCUMENTS

AU 2003252853 A1 11/2003
CN 106464958 A 2/2017
(Continued)

OTHER PUBLICATIONS

Lage, M., et al. "StatCast Dashboard: Exploration of Spatiotemporal Baseball Data", IEEE Computer Society, Sep./Oct. 2016, pp. 28-37.
(Continued)

*Primary Examiner* — Thai Q Tran
*Assistant Examiner* — Nienru Yang
(74) *Attorney, Agent, or Firm* — Scully, Scott, Murphy & Presser, P.C.; Jared Chaney

(57) ABSTRACT

One or more processor can automatically identify, structure and retrieve spatial and/or temporal sequences of digital media content according to semantic specification. Digital media content can be received and information from digital media content can be extracted. Based on the information, a knowledge graph can be constructed or structured to include at least one of spatial and temporal representation of the digital media content. A search query can be received associated with the digital media content. Based on traversing the knowledge graph structure according to at least one of spatial and temporal criterion mapped from the search query, new digital media content can be composed which meets the search query.

20 Claims, 10 Drawing Sheets

(51) Int. Cl.
| | |
|---|---|
| *G06F 16/901* | (2019.01) |
| *G06V 10/46* | (2022.01) |
| *G06F 16/783* | (2019.01) |
| *G06V 10/764* | (2022.01) |
| *G06F 16/71* | (2019.01) |
| *G06V 10/70* | (2022.01) |
| *G06F 16/483* | (2019.01) |

(52) U.S. Cl.
CPC ........ *G06F 16/7328* (2019.01); *G06F 16/783* (2019.01); *G06F 16/9027* (2019.01); *G06F 16/9535* (2019.01); *G06V 10/70* (2022.01); *G06V 10/764* (2022.01)

(58) Field of Classification Search
CPC ............. G06F 16/9535; G06F 16/7328; G06F 16/9027
USPC ........................................................ 386/239
See application file for complete search history.

(56) References Cited

U.S. PATENT DOCUMENTS

| | | | |
|---|---|---|---|
| 8,539,336 | B2 | 9/2013 | Griffiths et al. |
| 8,995,717 | B2 | 3/2015 | Cheng et al. |
| 9,395,442 | B2 | 7/2016 | Pacholski et al. |
| 10,402,655 | B2 | 9/2019 | Javan Roshtkhari et al. |
| 10,803,050 | B1 * | 10/2020 | Salkola ................. G06F 16/904 |
| 10,825,227 | B2 * | 11/2020 | Amer .................... G06F 40/279 |
| 2004/0220965 | A1 | 11/2004 | Harville et al. |
| 2013/0325787 | A1 | 12/2013 | Gerken et al. |
| 2015/0248917 | A1 | 9/2015 | Cheng et al. |
| 2018/0204111 | A1 * | 7/2018 | Zadeh .................. G06N 3/0436 |
| 2018/0210939 | A1 * | 7/2018 | Cho .................... G06F 16/2477 |
| 2018/0349361 | A1 | 12/2018 | Sripada |

FOREIGN PATENT DOCUMENTS

| | | |
|---|---|---|
| CN | 109033476 A | 12/2018 |
| EP | 2112619 B1 | 7/2012 |
| WO | 2013182915 A2 | 12/2013 |

OTHER PUBLICATIONS

Dietrich, C., et al. "Baseball4d: A Tool for Baseball Game Reconstruction & Visualization", IEEE Symposium on Visual Analytics Science and Technology 2014, Nov. 9-14, 2014, pp. 23-32.

Karim, S., et al., "Spatiotemporal Aspects of Big Data", Applied Computer Systems, Dec. 2018, pp. 90-100, vol. 23, No. 2.

Mitra, S., et al., "Confluence: Adaptive Spatiotemporal Data Integration Using Distributed Query Relaxation over Heterogeneous Observational Datasets", 2018 IEEE/ACM 11th International Conference on Utility and Cloud Computing (UCC), Downloaded on Aug. 3, 2020, pp. 184-193.

Zhong, X., et al., "Stream Kriging: Incremental and recursive ordinary Kriging over spatiotemporal data streams," Computers &Geosciences, Accepted Mar. 2, 2016, Available online Mar. 3, 2016, pp. 134-143, vol. 90.

Cao, H., et al., "Discovery of Periodic Patterns in Spatiotemporal Sequences", IIEEE Transactions on Knowledge and Data Engineering, Apr. 2007, pp. 453-467, vol. 19, No. 4.

Shekhar, S., et al., "Spatiotemporal Data Mining: A Computational Perspective", ISPRS Int. J. Geo-Inf. 2015, Accepted Oct. 12, 2015, Published Oct. 28, 2015, pp. 2306-2338, 4.

Majidpour, J., et al., "Automatic image annotation base on Naïve Bayes and Decision Tree classifiers using MPEG-7", 5th Conference on Knowledge-Based Engineering and Innovation, Iran University of Science and Technology, Tehran, Iran (2019), Downloaded on Sep. 14, 2020, pp. 007-012.

Wu, R.S., et al., "A Semantic Image Retrieval Framework Based on Ontology and Naïve Bayesian Inference", International Journal of Multimedia Technology, 2012, pp. 36-43, vol. 2, Iss. 2.

Sikos, L.F., "Ontology-Based Structured Video Annotation for Content-Based Video Retrieval via Spatiotemporal Reasoning", Springer Nature 2018, H. Kwasnicka and L. C. Jain (eds.), Bridging the Semantic Gap in Image and Video Analysis, Intelligent Systems Reference Library 145, Chapter 6, First online Feb. 21, 2018, pp. 97-122.

Weiss, R., et al., "Composition and Search with a Video Algebra", IEE MultiMedia, Spring 1995, pp. 12-25.

NIST, "NIST Cloud Computing Program", http://csrc.nist.gov/groups/SNS/cloud-computing/index.html, Created Dec. 1, 2016, Updated Oct. 6, 2017, 9 pages.

* cited by examiner

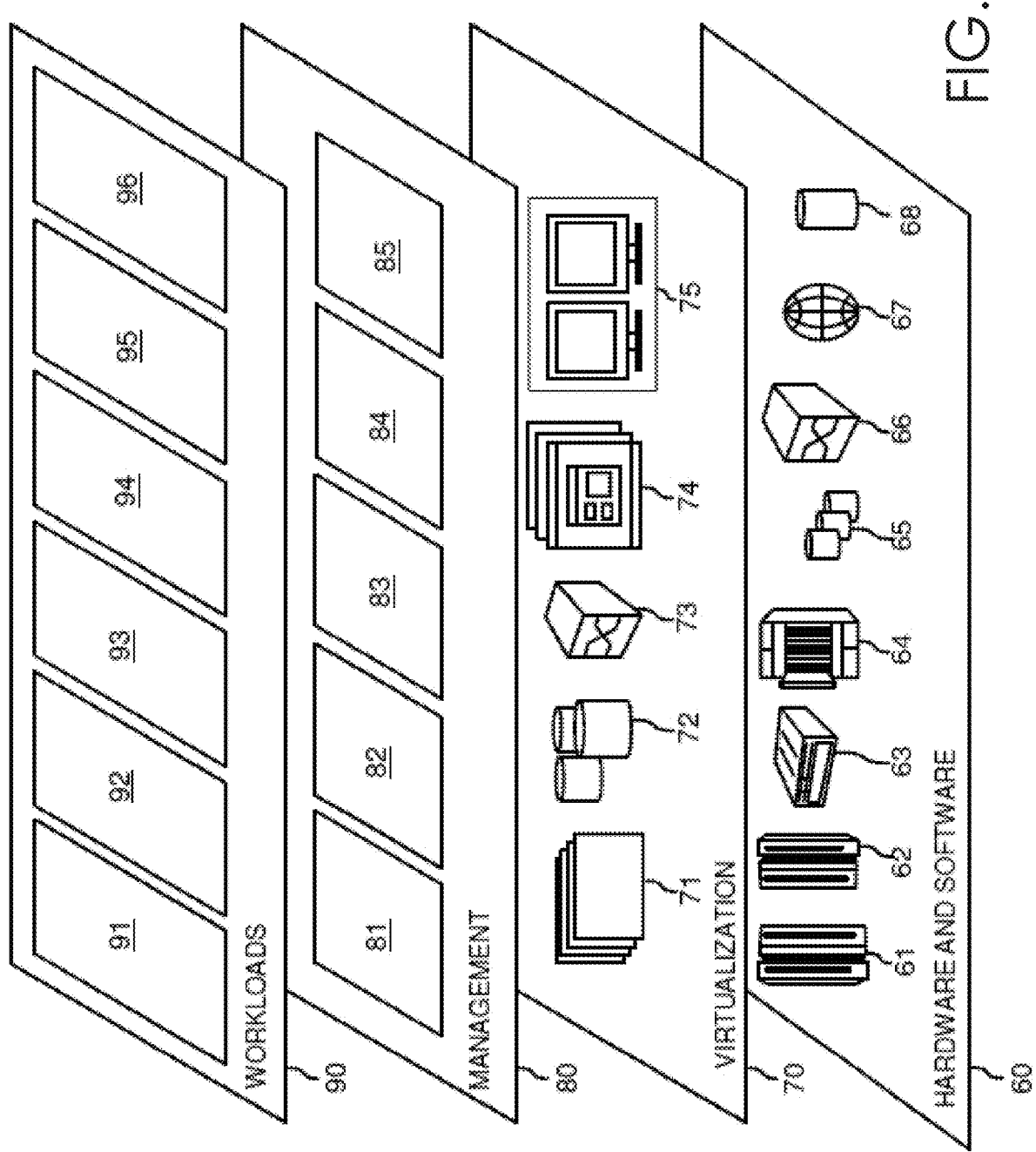

SPATIOTEMPORAL SEQUENCES OF CONTENT

BACKGROUND

The present application relates generally to computers and computer applications, machine learning, digital media, and more particularly to automatically identifying, structuring and/or retrieving spatial, temporal and/or spatiotemporal sequences of content such as digital media content according to semantic specification.

Currently, to analyze semantics on chronological events and facts recorded in digital content, for example, but not limited to audiovisual content, users seek through its entirety to find specific fragments in which they may be interested. For instance, in order to retrieve a number of video recordings portraying a specific sequence of events, users may have to watch the entire content, for instance, using playback controls to find the specific events in time.

While existing data driven and video analytics tools may be used to extract or edit information from digital media content, it can still be difficult to identify a semantic connection between the original and edited or extracted content. Further, the information extracted by these tools may usually not be structured in a query-able format and may be limited to low level features of the content.

BRIEF SUMMARY

The summary of the disclosure is given to aid understanding of a computer system and method, which can process content such as digital media content, and not with an intent to limit the disclosure or the invention. It should be understood that various aspects and features of the disclosure may advantageously be used separately in some instances, or in combination with other aspects and features of the disclosure in other instances. Accordingly, variations and modifications may be made to the computer system, the architectural structure, data structure, processor, and/or their method of operation to achieve different effects.

Automatic structuring and/or retrieving of spatial and/or temporal sequences of content can be provided. A computer-implement method, in one aspect, can include extracting information from digital media content. The method can also include, based on the information, structuring at least one of spatial and temporal representation of the digital media content in a knowledge graph structure. The method can further include receiving a search query associated with the digital media content. The method can also include, based on traversing the knowledge graph structure according to at least one of spatial and temporal criterion mapped from the search query, composing new digital media content meeting the search query.

For example, digital media content can be searched via a query and one or more fragments satisfying the search query can be provided. Such resulting one or more fragments can be shown temporally and/or spatially relative to the entire digital media content.

In another aspect, a computer-implement method can include extracting information from digital media content. The method can also include, based on the information, structuring at least one of spatial and temporal representation of the digital media content in a knowledge graph structure. The method can further include receiving a search query associated with the digital media content. The method can also include, based on traversing the knowledge graph structure according to at least one of spatial and temporal criterion mapped from the search query, composing new digital media content meeting the search query. The knowledge graph can include a content node representing the digital media content, a plurality of concept nodes representing a corresponding plurality of concepts in the digital media content, and a plurality of anchors representing time, where the content node and a concept node of the plurality of concept nodes are connected via an anchor.

In yet another aspect, a computer-implement method can include extracting information from digital media content. The method can also include, based on the information, structuring at least one of spatial and temporal representation of the digital media content in a knowledge graph structure. The method can further include receiving a search query associated with the digital media content. The method can also include, based on traversing the knowledge graph structure according to at least one of spatial and temporal criterion mapped from the search query, composing new digital media content meeting the search query. The knowledge graph includes a content node representing the digital media content, a plurality of concept nodes representing a corresponding plurality of concepts in the digital media content, and a plurality of anchors representing spatial information in the digital media content, where the content node and a concept node of the plurality of concept nodes are connected via an anchor.

In still another aspect, a computer-implement method can include extracting information from digital media content. The method can also include, based on the information, structuring at least one of spatial and temporal representation of the digital media content in a knowledge graph structure. The method can further include receiving a search query associated with the digital media content. The method can also include, based on traversing the knowledge graph structure according to at least one of spatial and temporal criterion mapped from the search query, composing new digital media content meeting the search query. The information can be extracted by a machine learning model that classifies labels corresponding to a plurality of fragments of the digital media content, where a concept associated with a fragment can be determined based on at least one label.

In still yet another aspect, a computer-implement method can include extracting information from digital media content. The method can also include, based on the information, structuring at least one of spatial and temporal representation of the digital media content in a knowledge graph structure. The method can further include receiving a search query associated with the digital media content. The method can also include, based on traversing the knowledge graph structure according to at least one of spatial and temporal criterion mapped from the search query, composing new digital media content meeting the search query. The knowledge graph can include a content node representing the digital media content, a plurality of concept nodes representing a corresponding plurality of concepts in the digital media content, and a plurality of anchors representing time, where the content node and a concept node of the plurality of concept nodes are connected via an anchor. The plurality of concept nodes of the knowledge graph structure can be traversed to find concept nodes that match a concept specified in the search query and the matched concept nodes can be chained based on a temporal criterion mapped from the search query, where the new digital media content is composed based on digital media content fragments associated with chained matched concept nodes.

In yet another aspect, a computer-implement method can include extracting information from digital media content.

The method can also include, based on the information, structuring at least one of spatial and temporal representation of the digital media content in a knowledge graph structure. The method can further include receiving a search query associated with the digital media content. The method can also include, based on traversing the knowledge graph structure according to at least one of spatial and temporal criterion mapped from the search query, composing new digital media content meeting the search query. The knowledge graph includes a content node representing the digital media content, a plurality of concept nodes representing a corresponding plurality of concepts in the digital media content, and a plurality of anchors representing spatial information in the digital media content, where the content node and a concept node of the plurality of concept nodes are connected via an anchor. The plurality of concept nodes of the knowledge graph structure can be traversed to find concept nodes that match a concept specified in the search query and the matched concept nodes are chained based on at least a spatial criterion mapped from the search query, where the new digital media content can be composed based on digital media content fragments associated with chained matched concept nodes.

In yet another aspect, a computer-implement method can include extracting information from digital media content. The method can also include, based on the information, structuring at least one of spatial and temporal representation of the digital media content in a knowledge graph structure. The method can further include receiving a search query associated with the digital media content. The method can also include, based on traversing the knowledge graph structure according to at least one of spatial and temporal criterion mapped from the search query, composing new digital media content meeting the search query. The method can further include presenting the knowledge graph structure to a user and allowing the user to edit the knowledge graph.

In yet another aspect, a computer-implement method can include extracting information from digital media content. The method can also include, based on the information, structuring at least one of spatial and temporal representation of the digital media content in a knowledge graph structure. The method can further include receiving a search query associated with the digital media content. The method can also include, based on traversing the knowledge graph structure according to at least one of spatial and temporal criterion mapped from the search query, composing new digital media content meeting the search query. The method can further include automatically playing the new digital media content on a user interface.

A system including a processor and a memory device coupled with the processor can be provided, where the processor can be configured to perform one or more of the above described methods.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 10 illustrates a set of functional abstraction layers provided by cloud computing environment in one embodiment of the present disclosure.

DETAILED DESCRIPTION

Systems, methods and techniques are disclosed, in one or more embodiments, which can process digital media content and search queries related to the digital media content. In one or more embodiments, a system and/or method can extract spatiotemporal, spatial and/or temporal information from raw data such as video stream and/or audio stream, for example, digital media content, for example, using one or more machine learning techniques. In one or more embodiments, the system and/or method can structure relevant spatial, temporal and/or spatiotemporal information in a knowledge graph, for example, which can include nodes representing concepts represented in fragments of the digital media content. In one or more embodiment, by processing the knowledge graph, the system and/or method can present content fragments according to a specified query. In one or more embodiments, a knowledge graph can be constructed or generated to find a sequence of events according to a specified spatiotemporal (or spatial or temporal) criterion. In one or more embodiments, the graph processing finds correlations in time and space through nodes' anchors, which are content fragments' representation, allowing for rich reasoning. Using the structured knowledge graph, the system and/or method in one or more embodiments, can retrieve and compose content according to a search query or user's query. For example, the knowledge graph can provide a technical solution for allowing media content to be searched by a query, searched by temporal and/or spatial criterion, providing a search result which can include a fragment or a sequence of fragments in the media content.

In one or more embodiments, the system and/or method can provide a real-time automatic solution which can identify and structure semantics on nodes and anchors that represent spatiotemporal content and fragments; traverse the graph though links that connect nodes' spatiotemporal fragments; reason considering nodes' spatiotemporal fragments; provide event chain processing according to spatiotemporal content fragments; retrieve and compose digital media content by fragments (e.g., digital media content fragments) that represent event chain specification. The system and/or method in one or more embodiments can automatically identify, structure and retrieve spatiotemporal sequences of events and/or facts occurring in digital media content.

Figure 1:
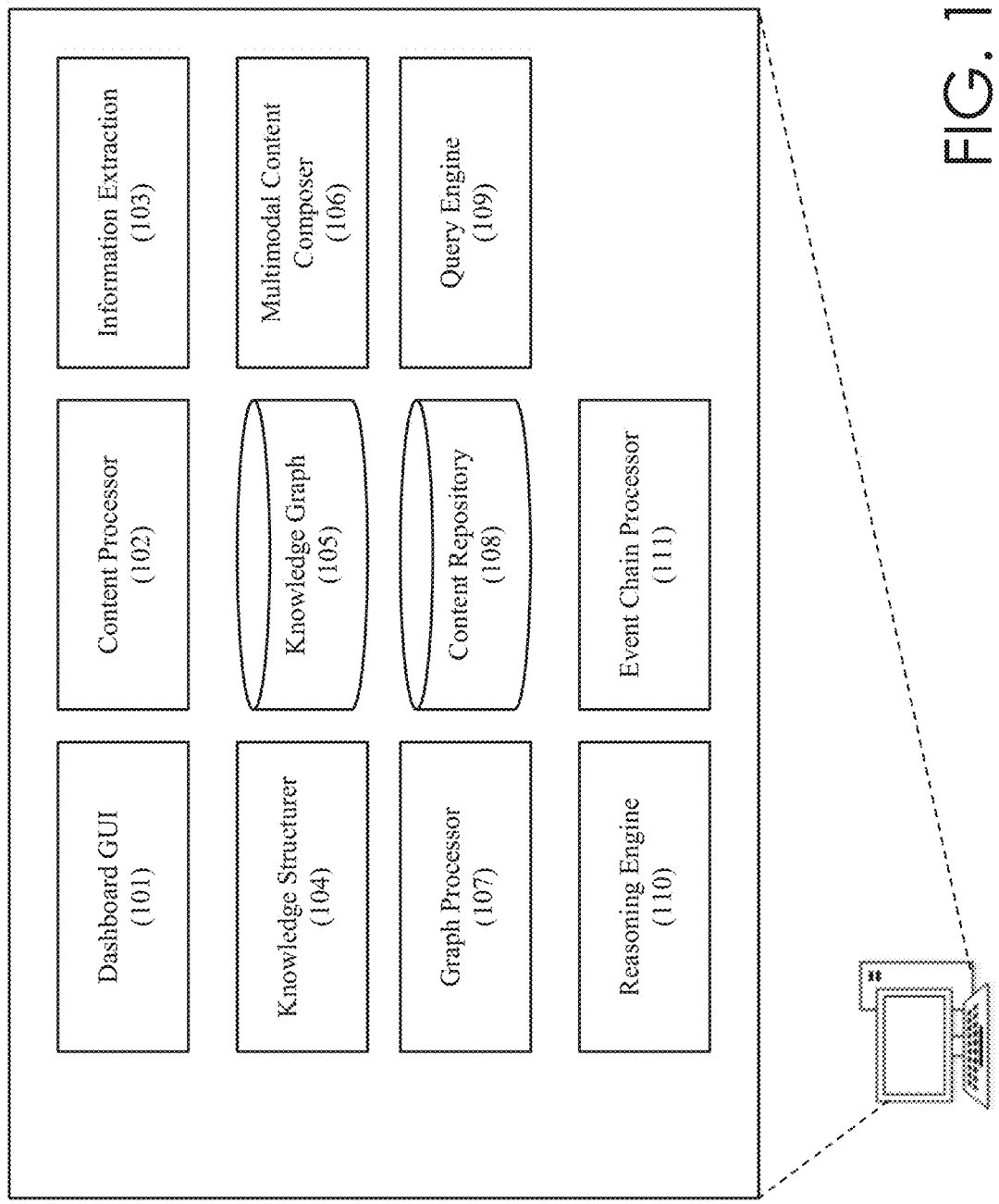
FIG. 1 is a diagram illustrating an example architectural view of a system in an embodiment.

FIG. 1 is a diagram illustrating an example architectural view of a system in an embodiment. The components shown include computer-implemented components, for instance, implemented and/or run on one or more processors or computer processors, e.g., including hardware processors, or coupled with one or more hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors.

A processor may be a central processing unit (CPU), a graphics processing unit (GPU), a field programmable gate array (FPGA), an application specific integrated circuit (ASIC), another suitable processing component or device, or one or more combinations thereof. The processor may be coupled with a memory device. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium.

In an embodiment, the system can employ one or more artificial intelligence (AI) techniques such as machine learning and computer vision for object identification and label classification from digital media contents to structure relevant spatiotemporal information in a knowledge graph through the representation of contextualized fragments. The knowledge graph can be structured with nodes, anchors and edges. In an aspect, this representation allows for retrieving and composing multiple digital contents, for example, as a result of a querying process, specifying a desirable sequence of spatiotemporal events and facts.

The system, in an embodiment, can traverse the knowledge graph in retrieving content fragments according to a specified query, which contains the semantic concepts of interest that define the desired content. In an embodiment, the graph processing finds correlations in time and space through the contextualized fragments' representation, allowing for rich reasoning.

The system, in an embodiment, can perform event chain processing according to spatiotemporal content fragments, and retrieve digital media content fragments that represent event chain specification. In an embodiment, traversing of the knowledge graph considers fragments of nodes and their semantics.

A dashboard graphical user interface (GUI) 101 allows users to perform querying against a knowledge graph 105 and content repositories 108. For example, a user interface 101 can be provided for allowing users to input digital media content and to query the digital media content. For instance, users can interact with the system using queries. The user interface also can present outputs to the user, for example, the search results, knowledge graph representation. The user interface 101 can also play the composed digital media content, e.g., generated as a result of the search.

A content processor 102 can implement one or more techniques such as machine learning and/or computer vision and/or natural language processing to initially classify content semantics and domain of given or input digital media content. For example, the content processor 102 can perform parsing and processing of all injected content, extracting its semantics to infer which kind of content it is and to what domain it is related. Techniques such as semantic analysis, video analysis and/or other techniques can be implemented or used to determine semantic concept associated with the content.

An information extraction component 103 can consider the inferred domain to further extract relevant concepts described in the digital media content. In an embodiment, the information extraction component 103 extracts classification labels related to the content. By way of example, a convolutional neural network may process images in the video and/or audio content and classify or label objects. A concept can be identified based on labeled or classified objects in a fragment of the digital media content. In this way, for example, a fragment of the digital media content can be associated with a concept.

A knowledge structurer 104 constructs a knowledge graph 105, which represents sequences or fragments in a structured manner. The knowledge graph includes nodes, anchors, and edges connecting the nodes. For example, a node (also referred to as a content node) can represent the digital media content. Another node (also referred to as a concept node) can represent a concept extracted in the digital media content. There can be a plurality of concept nodes. In an embodiment, each concept node can be linked or associated with a fragment of the digital media content. Edges connect the nodes in the knowledge graph. Knowledge graph 105 can be stored in one or more storage and/or memory devices.

For example, in an embodiment, a knowledge structurer component 104 creates a logical node (content node) in the graph, representing the injected content. For each label extracted by the information extraction component 103, the knowledge structurer 104 creates a concept node to represent the label, and spatial, temporal or spatiotemporal anchor in the content node. In this way, for example, the knowledge structure 104 creates a link or relationship between the appropriate anchor and the respective concept node fragment.

In an embodiment, a concept node can be represented as a pair (<fragment, concept>), e.g., concept linked to a fragment having the concept. The anchor represents spatial and/or temporal fragments of the content and they are used as endpoints in the relationship of the concept node with content fragments. For example, the anchor may specify time and/or space segments of the content node, instead of the entire digital media content. In an embodiment, a <fragment> associated with a <concept> as in concept node's <fragment, concept> pair can be identified based on the anchor that connects the concept node to the content node.

In an embodiment, all nodes, anchors and links are stored in (or as) a knowledge graph 105. Knowledge graph 105 can be stored in one or more storage and/or memory devices. The injected content (e.g., the digital media content) can be stored in a content repository 108. Content repository 108 can include one or more digital media content, and can be searched, for example, by a user, via the dashboard GUI 101. One or more storage or memory devices can store content repository 108.

In an embodiment, a query engine 109 can handle a query, for example, a user's search query. For instance, the query engine 109 parses the query, extracting concepts. For example, the query engine 109 can parse the query, for example, into tokens, and identify the elements in the query, for example, for use in searching the knowledge graph. The query engine 109, for example, in performing parsing may implement a natural language processing technique. In an embodiment, the query engine 109 can parse the query, extracting concepts and spatial and/or temporal operators, making association of operators and content fragments (e.g., which content fragments have related labels or concept nodes in the knowledge graph).

In an embodiment, a graph processor 107 and a reasoning engine 110 provide features for traversing the knowledge graph and expanding relationships between concepts and data based on hierarchical and structuring aspects. For example, the graph processor 107 extracts one or more subgraphs from the knowledge graph 105 according to the concepts (e.g., parsed from the query) and traverses the node fragments in the subgraphs. The reasoning engine 110 can calculate and decide for each node whether its connected pair <fragment, concept> match the requirements described in the spatial, temporal or spatiotemporal operators.

In an embodiment, an event-chain processor 111 processes one or more subgraphs creating event chains, calculating and deciding which chains meet the query demands according to event temporal, spatial, or spatiotemporal bounds or restrictions. A subgraph can include one or more concept nodes, e.g., possibly connected to other concept nodes, and also anchored by spatial, temporal or spatiotemporal anchor. For instance, one or more sequences of concept nodes (with associated content fragments), can be built or chained, in temporal and/or spatial order. A sequence that meets the query can be selected.

Multimodal content composer 106 can retrieve the media content from the fragments that represent the event chain specification and compose new content that represents the user interest, for example, a result of the search query. For example, concept nodes in an event chain can be linked or associated with fragments of the digital media content. These fragments can be extracted from the digital media content to compose new content, also injecting a representation (e.g., nodes, anchors and links) to this new content to the knowledge graph.

Figure 2:
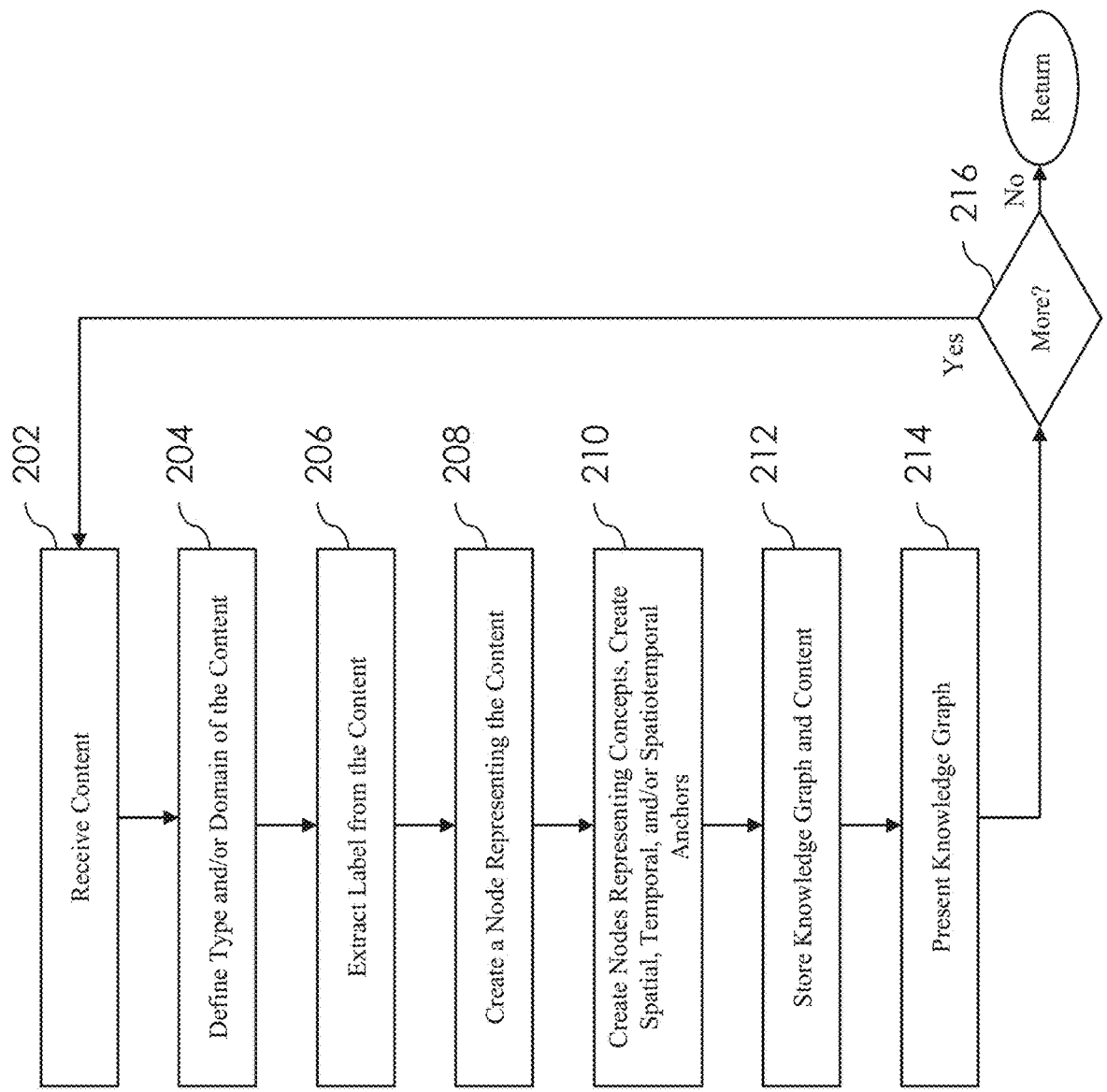
FIG. 2 is a flow diagram illustrating a method of structuring knowledge graph in an embodiment.

FIG. 2 is a flow diagram illustrating a method of structuring knowledge graph in an embodiment. The method can be implemented or performed on one or more computer processors, for example, including one or more hardware processors. At 202, content, e.g., digital media content is received. For example, a user may access a user interface such as the dashboard GUI (FIG. 1, 101) and enter or inject content such as digital media content.

At 204, the content is processed to define the type and domain of the content. For example, analytics techniques such as semantic analysis can be implemented to analyze the content such as video content and/or audio content, and to determine type and domain associated with the content.

At 206, labels can be extracted from the content. For example, a machine learning technique such as a neural network, for example, a convolutional neural network, can be implemented to extract classification labels related to the content. Another technique can be implemented to determine or extract labels or concepts associated with the content.

At 208, a logical node (e.g., referred to as content node) can be created in the knowledge graph to represent the content. Knowledge graph, for example, is implemented as a data structure with nodes and edges connecting the nodes. Nodes and edges can have attributes.

At 210, for a label extracted at 206, a concept node can be created to represent the label. For example, in an embodiment, a concept node can be created for each label extracted at 206. Spatial, temporal or spatiotemporal anchors are also created in the content node. For instance, space and/or time associated with the label (and the fragment that the label pertains to) are created as anchors in the content node and linked to the concept node. In this way, in an embodiment, a link or relationship is created between the appropriate anchor and the respective concept node fragment.

At 212, all nodes, anchors and links are stored in the knowledge graph, for example, the knowledge graph data structure, and the content associated with the knowledge graph can be stored in a content repository.

At 214, the knowledge graph can be displayed on a dashboard GUI, for example, allowing user curation. A user interface, for instance, can receive user inputted corrections to the knowledge graph. For example, in embodiment, the knowledge graph structure can be presented to a user, for example, on a user interface such as the dashboard GUI (e.g., FIG. 1, 101). The user interface can provide control elements or functions that allow the user to edit the knowledge graph. The method can also include automatically learning, for example, continuously or continually, from the user interaction with the user interface. Based on user interactions, one or more processors may use the user interactions or corrections as feedback and learn to make or recommend corrections autonomously.

At 216, if another content is received, the logic of the method continues processing at 202.

Figure 3:
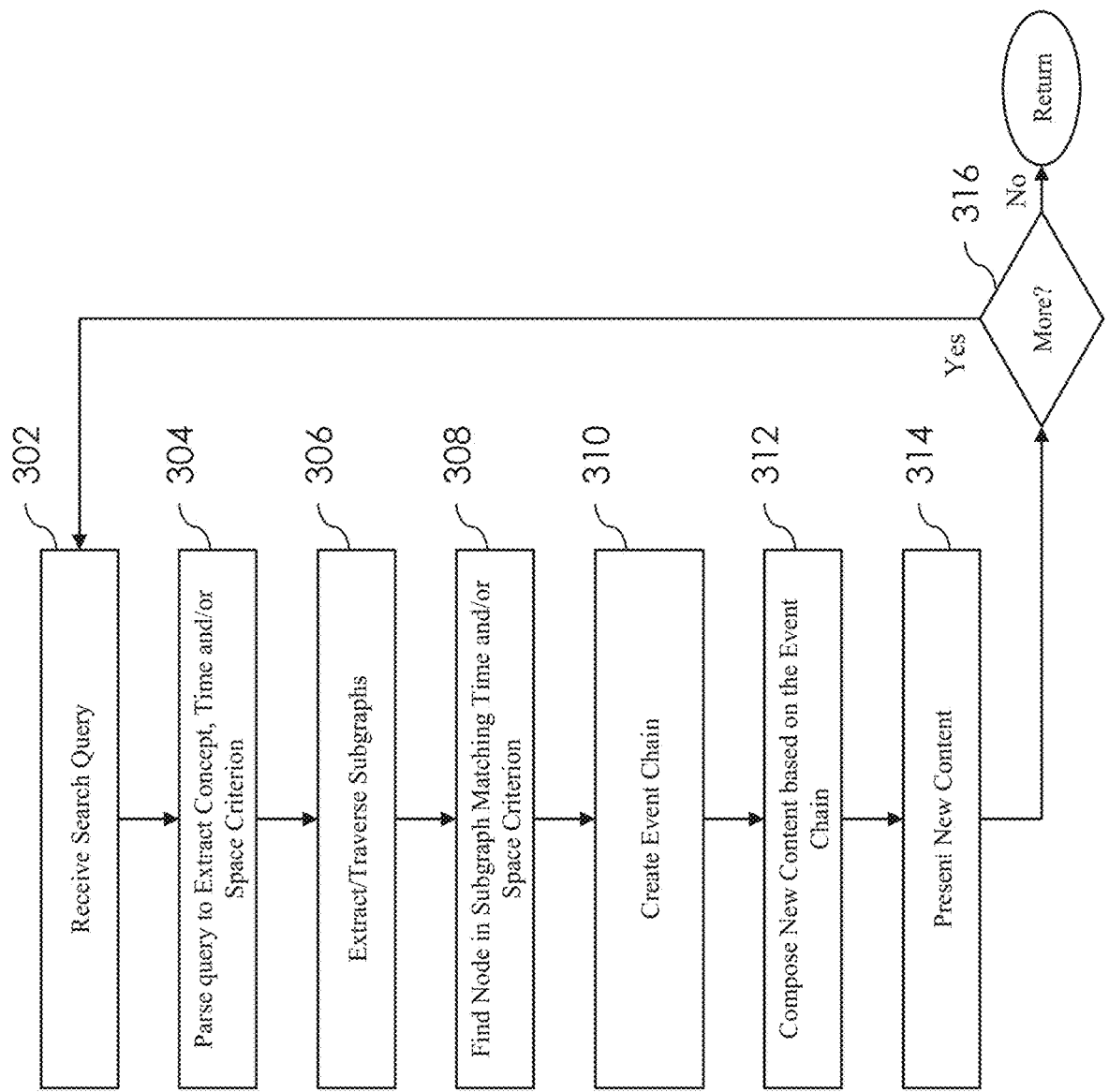
FIG. 3 is a flow diagram illustrating a method of retrieving content fragments by performing graph traversal in an embodiment.

FIG. 3 is a flow diagram illustrating a method of retrieving content fragments by performing graph traversal in an embodiment. The method can be implemented or performed on one or more computer processors, for example, including one or more hardware processors. For example, one or more hardware processor may perform query and retrieval through spatial, temporal or spatiotemporal reasoning, traversing a graph through fragments of content. At 302, a query or a search query can be received, for searching digital media content. In an embodiment, the digital media content can be received with the search query, and if the digital media content does not have a corresponding knowledge graph structure, e.g., stored in a content repository, a knowledge graph or knowledge graph structure can be constructed, for example, as described with reference to FIG. 2.

At 304, the method can include parsing the query and extracting concepts from the query. By way of example, a query engine shown in FIG. 1 at 109 can perform this task. For example, the query engine parses the query, extracting concepts and spatial-temporal operators (e.g., spatial, temporal or spatiotemporal information), making association of operators and content fragments. In an aspect, one or more time and/or space operators can be mapped or inferred from a specified event or action in the query.

At 306, the method can include extracting subgraphs from the knowledge graph. For example, the graph processor (FIG. 1, 107) can perform this task. For instance, the graph processor 107 extracts one or more subgraphs from the knowledge graph according to the concepts and traverses the node fragments in extracted one or more subgraphs. A subgraph can include one or more concept nodes, e.g., possibly connected to other concept nodes, and also anchored by spatial, temporal or spatiotemporal anchor. A concept node can be represented as a pair (<fragment, concept>), e.g., concept linked to a fragment having the concept. In an embodiment, a <fragment> associated with a <concept> in concept node's <fragment, concept> pair can be identified based on the anchor that connects the concept node to the content node. The anchor represents spatial and/or temporal relationship of the concept node with the content, e.g., represented as a content node. For example, the anchor specifies time and/or space of the concept node's occurrence relative to entire digital media content.

At 308, for each subgraph, the method can include calculating and deciding for each node in the subgraph, whether the node's connected pair (<fragment, concept>) matches the requirements described in the spatial, temporal or spatiotemporal operators. For instance, the reasoning engine (FIG. 1, 110) can perform this task.

At 310, the method can include processing subgraphs creating event chains, calculating and deciding which chains meet the query demands according to event temporal and/or spatial restrictions or bounds. For instance, one or more sequences of concept nodes (with associated content fragments), can be built or chained, in temporal and/or spatial order. A sequence that meets the query can be selected. For example, the event-chain processor (FIG. 1, 111) can perform this task.

At 312, the method can include retrieving the media content from the fragments that represent the event chain specification and composing new content that represents the user interest, for example, meets the search query. For example, a concept node in an event chain is linked or associated with a fragment of the digital media content. That fragment can be extracted from the digital media content to compose the new content. By way of example, the multi-modal content composer (FIG. 1, 106) can perform this task.

At 314, the resulting new content can be presented. The new content includes a fragment or a sequence of fragments of the digital media content, and represents the search result meeting the search query. For example, a user interface such as the dashboard GUI (FIG. 1, 101) can display the new digital media content such as a video stream and/or an audio stream, providing navigation controls for a user to play the new digital media content. In another aspect, the dashboard GUI can automatically present and play the new content on a user interface device.

At 316, if another query is received, the processing continues to 304, for example, repeating the method based on another query received.

Figure 4:
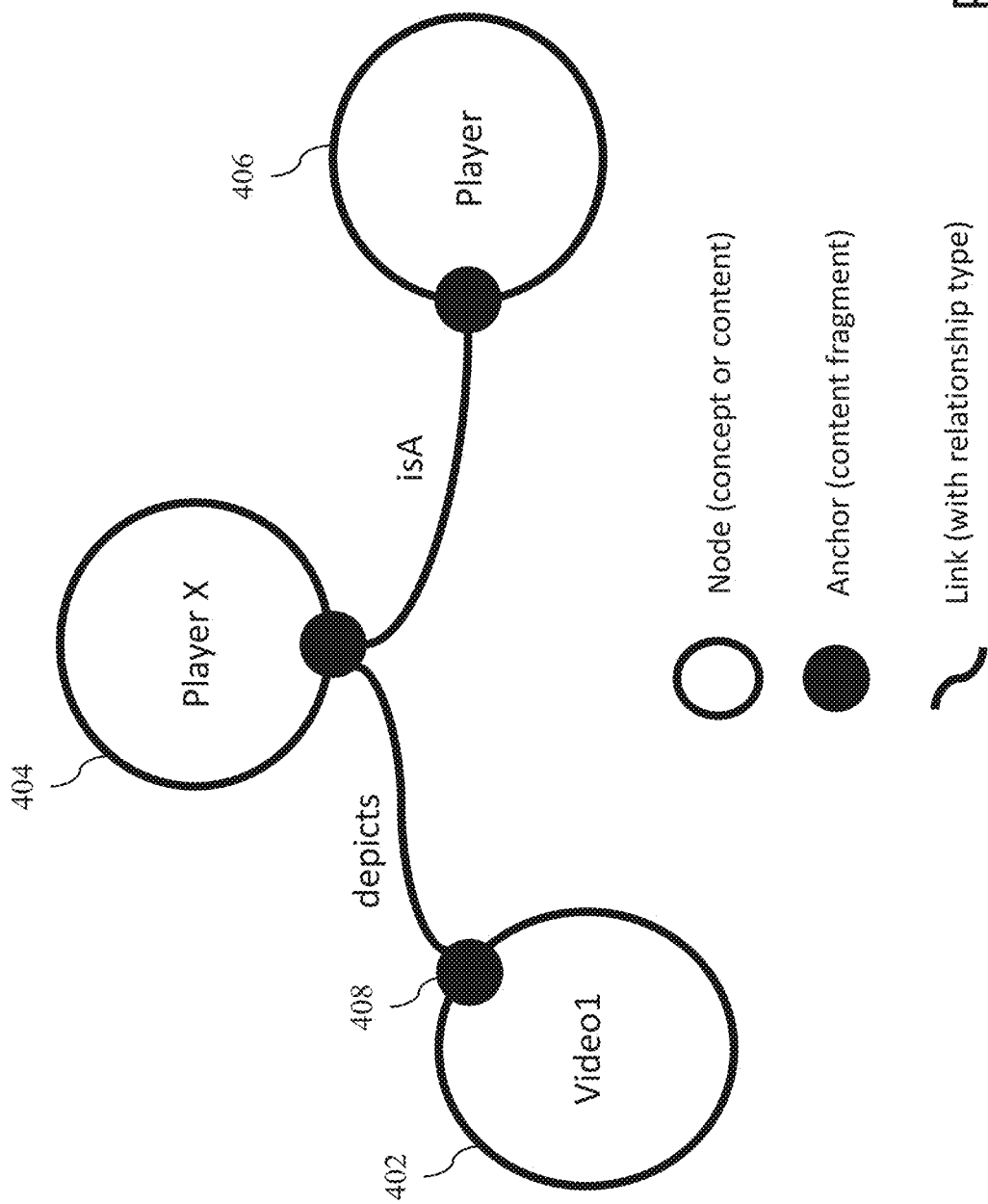
FIG. 4 is a diagram illustrating knowledge graph components in an embodiment.

FIG. 4 is a diagram illustrating knowledge graph components in an embodiment. The knowledge graph in an embodiment is structured to include a plurality of nodes. There can be a content node 402, which represents the entire content, e.g., digital media content. There can also be a concept node, e.g., 404, 406, which represents a concept extracted from the digital media content. The concept node can further be linked to, or associated with, a fragment of the digital media content containing that concept. An anchor 408 represents particular time and/or space, where the concept represented in the associated fragment occurs relative to, or in, the content. Edges connect the nodes and represent particular relationships between the nodes. By way of example only, the content represented by the content node can be a video stream or content showing a game event with a number of players. Player X (e.g., by name) can be performing an action in the video at time T. A knowledge graph can represent such information with a content node 402 representing the video, a concept node 404 representing particular Player X connected to the content node 402 by relationship "depicts", and another concept node 406 representing "player" concept connected to the Player X node by relationship "isA" (e.g., "is a"). In an embodiment, the connections can include an anchor 408 that represents the time and/or space of the relationship of the concept node to the content node. A knowledge graph can have multitude of concept nodes and anchors.

Figure 5:
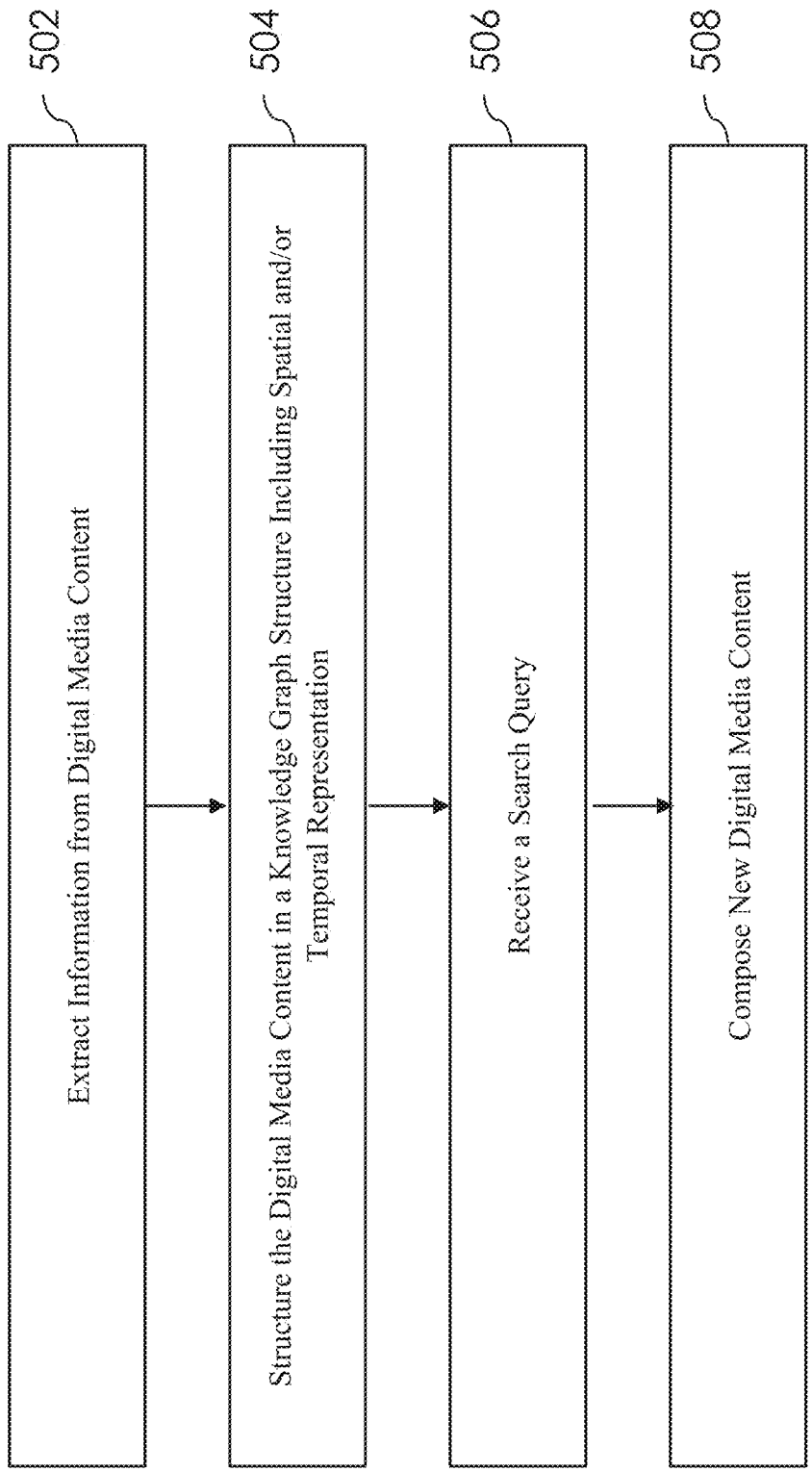
FIG. 5 is another flow diagram illustrating a method of structuring and composing new content in an embodiment.

FIG. 5 is a flow diagram illustrating a method in an embodiment. The method, in an embodiment, structures and retrieves spatial and/or temporal sequences of digital media content according to semantic specification. The method can be implemented on or performed by one or more processors such as hardware processors. At 502, information is extracted from digital media content. For instance, one or more machine learning techniques can be used or implemented to identify or classify concepts and/or class labels associated with fragments of the digital media content. For example, a machine learning model such as a convolutional neural network (but not limited to such) can classify labels corresponding to a plurality of fragments of the digital media content. A concept associated with a fragment can be determined based on at least one label.

At 504, based on the information, spatial and/or temporal representation of the digital media content can be structured in a knowledge graph structure, for example, as described above with reference to FIG. 2. In an embodiment, the knowledge graph includes a content node representing the digital media content, a plurality of concept nodes representing a corresponding plurality of concepts in the digital media content, and a plurality of anchors representing spatial information and/or time information. The content node and a concept node of the plurality of concept nodes can be connected via an anchor. An example knowledge graph with sample components is shown in FIG. 4.

In embodiment, the knowledge graph structure can be presented to a user, for example, on a user interface. The user interface can provide control elements or functions that allow the user to edit the knowledge graph.

At 506, a search query associated with the digital media content. The search query can be parsed to extract one or more concepts, for example, as described above with reference to FIG. 3. At 508, for example, based on traversing the knowledge graph structure according to at least one of spatial and temporal criterion mapped from the search query, new digital media content meeting the search query can be composed. For instance, in an embodiment, the plurality of concept nodes of the knowledge graph structure can be traversed to find concept nodes that match a concept specified in the search query. The matched concept nodes can be chained based on a temporal and/or spatial criterion mapped from the search query. The new digital media content can be composed based on digital media content fragments associated with chained matched concept nodes. In an embodiment, the new digital media content can be presented to a user, for example, on a user interface or user interface device. The interface can include play control elements or buttons, which the user can use to play the new digital media content. In an embodiment, the user interface or a processor running the user interface can also automatically play the new digital media content on a user interface device.

Figure 6A:
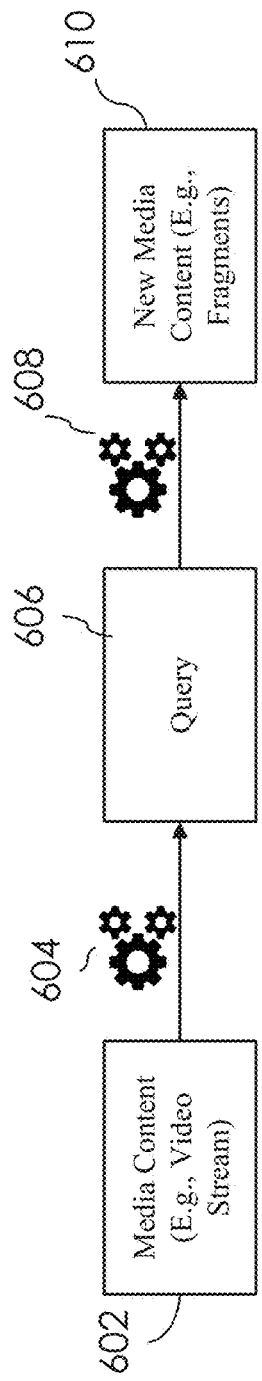
FIGS. 6A, 6B and 6C illustrate example scenarios in embodiments.
Figure 6B:
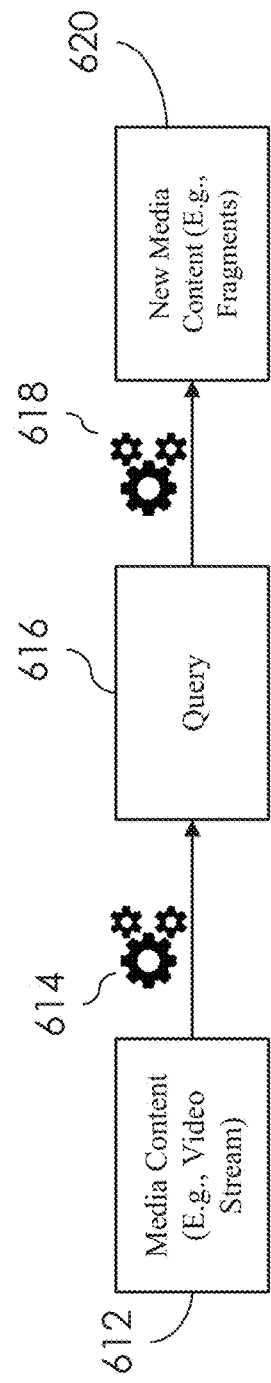
Figure 6C:
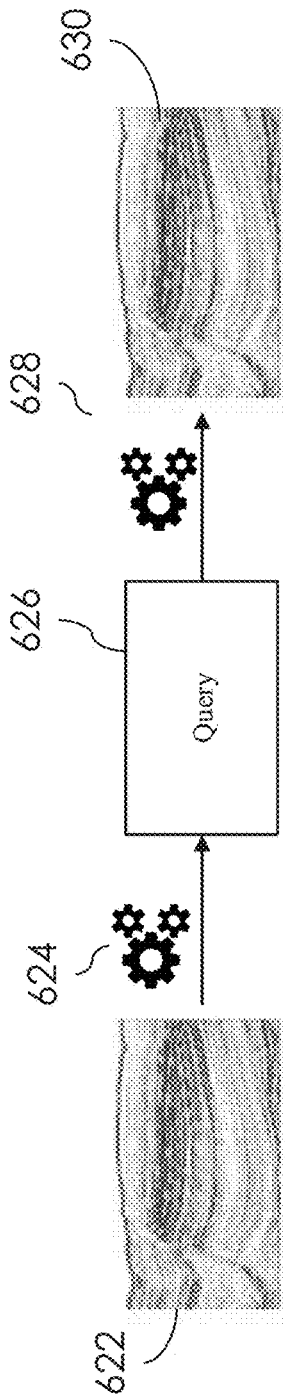

FIGS. 6A, 6B and 6C illustrate example scenarios in embodiments. Referring to FIG. 6A, digital media content can include a video stream 602 of an event such as a game match with a plurality of player performing acts. For instance, a content provider (e.g., user) injects content 602 using a dashboard GUI. A knowledge graph structure 604 can be constructed, which captures semantic representation of the digital media content, e.g., fragments of the digital media content, with spatial and/or temporal representation, as disclosed herein (e.g., with reference to one or more of FIGS. 1-5). For example, one or more processors cam process the video stream data, extracting semantic information from content fragments, and structuring this information in a knowledge graph. A query can be received for searching the digital media content, for example, via a user interface. For example, the user or another user may enter a query looking for one or more specific events. For instance, the user may be interested in seeing all touchdowns scored by a player, where this player runs more than 40 yards to score. By way of example, the query 606 can specify, "find all touchdowns scored by a player where player runs more than 40 yards." The knowledge graph structure can be traversed (e.g., shown at 608) to find the specified acts requested in the search query. For example, one or more processors can process the query, finding in the knowledge graph all fragments that match the query specification. New digital media content can be composed, which includes, fragments of the digital media content meeting the search query request, for example, as disclosed herein (e.g., with reference to one or more of FIGS. 1-5). The resulting new digital media content 610 can be presented or played on a user interface device, for example, via a graphical user interface.

FIG. 6B illustrates another example scenario, similar to one shown in FIG. 6A, but in a different domain, for example, a video recording of a professional presentation. A video recording of a presentation 612 is injected, e.g., by a user, another automatic processor, and/or another. A knowledge graph 614 is constructed. A query 616 is received. For example, a user may query for content according to a sequence of subjects (concepts) discussed in the presentation. For instance, a user may want to see all scenes where a presenter talks about Topic 1, Topic 2 and Topic 3. The knowledge graph structure can be traversed (e.g., shown at 618) to find the specified scenes requested in the search query. The resulting new digital media content 620 can be presented or played on a user interface device, for example, via a graphical user interface.

FIG. 6C illustrates another example scenario. For example, multimodal geological content 622 may be continuously injected by a third-party advisor system. A knowledge graph 624 is constructed, e.g., using spatial and/or temporal information. A user may query 626 the knowledge graph for sequences such as: all seismic image fragments from prospect interpretations with identification of petroleum systems carried before (or after) acquisition of 3-dimensional (3D) seismic data from the S Basin. The knowledge graph structure can be traversed (e.g., shown at 628) to find the specified image fragments in the search query. The resulting new digital media content 630 can be presented via a user interface, for example, on a user interface device. The returned content may be useful for comparing and analyzing possible trends in the knowledgebase, e.g., after a relevant content is acquired.

In one or more embodiment, systems and methods in one or more embodiment can automatically structure and retrieve spatiotemporal sequences of events and/or facts in digital media content. For example, systems and methods in one or more embodiment can structure information from digital media content in a query-able format. In one or more embodiments, systems and methods can correlate digital media content fragments to their meaning, the semantic concepts they represent, and correlate how these meaningful fragments relate to each other in time and space.

In an embodiment, a system and/or method can automatically extract information from digital media content, for example, using one or more machine learning techniques for object identification and label classification from the content fragments to structure relevant spatiotemporal information in a knowledge graph representation of contextualized fragments using nodes, anchors and edges, retrieve and compose multiple digital content according to queries with a specified sequence of spatiotemporal events and facts.

Figure 7:
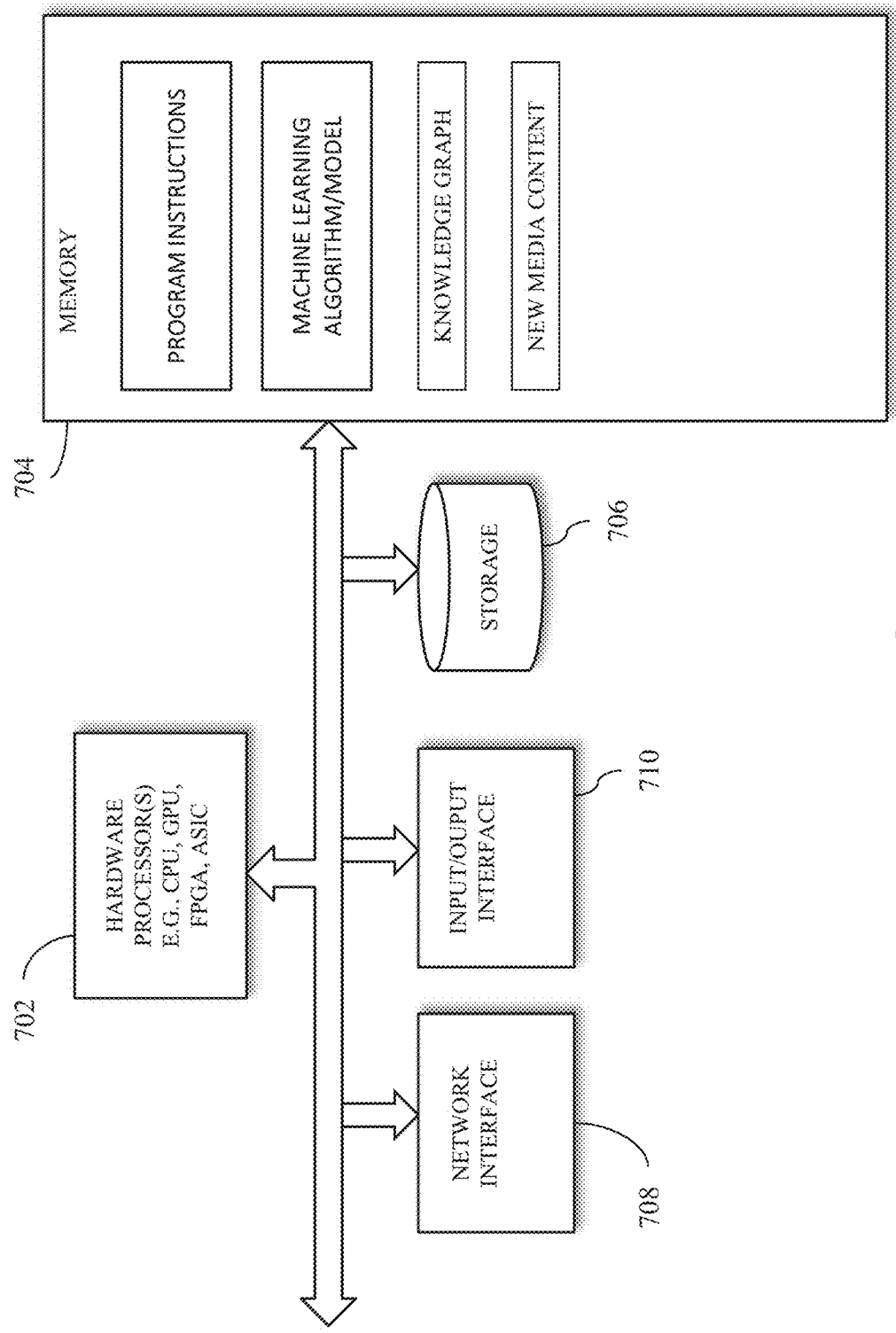
FIG. 7 is a diagram showing components of a system in one embodiment, which can automatically identify, structure and retrieve spatiotemporal sequences of digital media content according to semantic specification.

FIG. 7 is a diagram showing components of a system in one embodiment, which can automatically identify, structure and retrieve spatiotemporal sequences of digital media content according to semantic specification. One or more hardware processors 702 such as a central processing unit (CPU), a graphic process unit (GPU), and/or a Field Programmable Gate Array (FPGA), an application specific integrated circuit (ASIC), and/or another processor, may be coupled with a memory device 704, and generate a knowledge graph, traverse the graph and/or compose new media content, e.g., digital media content. A memory device 704 may include random access memory (RAM), read-only memory (ROM) or another memory device, and may store data and/or processor instructions for implementing various functionalities associated with the methods and/or systems described herein. One or more processors 702 may execute computer instructions stored in memory 704 or received from another computer device or medium. A memory device 704 may, for example, store instructions and/or data for functioning of one or more hardware processors 702, and may include an operating system and other program of instructions and/or data. One or more hardware processors 702 may receive input comprising digital media content. At least one hardware processor 702 may generate a knowledge graph structure capturing concepts and spatial and/or temporal information of the digital media content or of fragments in the digital media content. In one aspect, the digital media content may be stored in a storage device 706 or received via a network interface 708 from a remote device, and may be temporarily loaded into a memory device 704 for building or generating the knowledge graph. The generated knowledge graph be stored on the storage device 706 and/or loaded on a memory device 704, for example, for traversing by one or more hardware processors 702. One or more hardware processors 702 may be coupled with interface devices such as a network interface 708 for communicating with remote systems, for example, via a network, and an input/output interface 710 for communicating with input and/or output devices such as a keyboard, mouse, display, and/or others.

Figure 8:
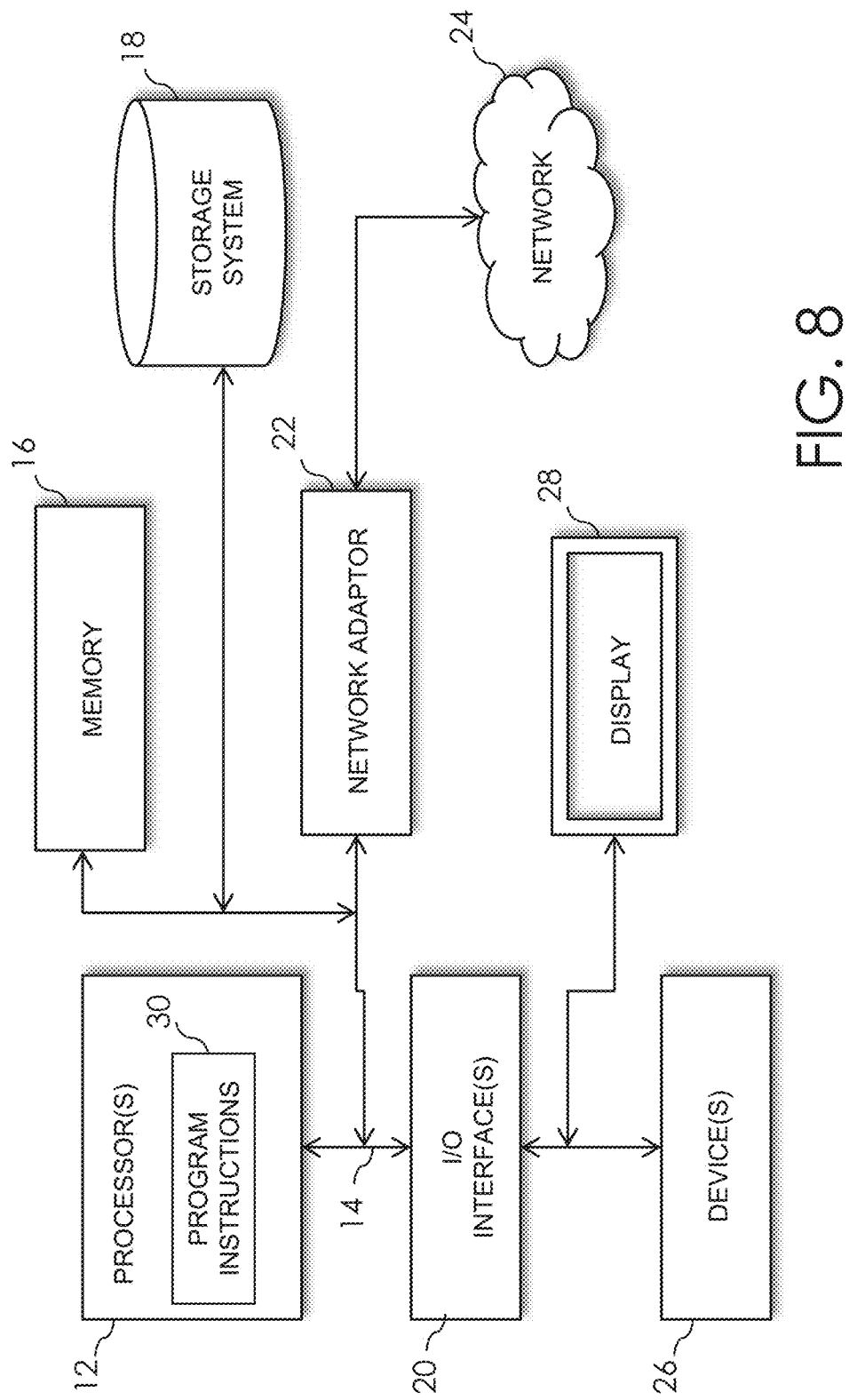
FIG. 8 illustrates a schematic of an example computer or processing system that may implement a system in one embodiment.

FIG. 8 illustrates a schematic of an example computer or processing system that may implement a system in one embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 8 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being run by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
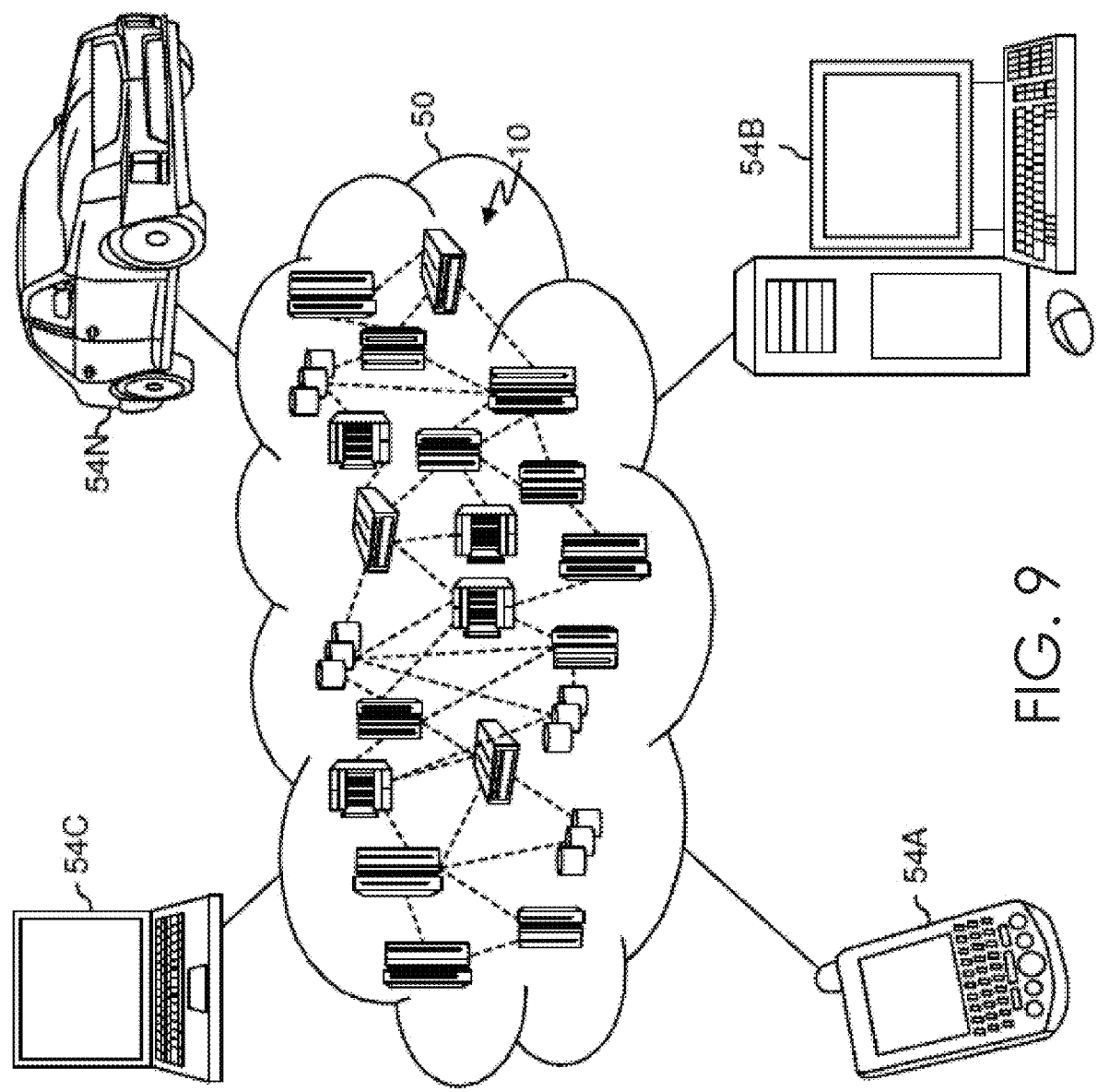
FIG. 9 illustrates a cloud computing environment in one embodiment.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and media content processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, run concurrently, substantially concurrently, in a partially or wholly temporally overlapping manner, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
extracting information from digital media content by performing semantic analysis wherein a plurality of semantic concepts is extracted from the digital media content;
based on the information, structuring at least one of spatial and temporal representation of the digital media content in a knowledge graph structure, the knowledge graph including at least a plurality of concept nodes representing a corresponding plurality of semantic concepts in the digital media content;
receiving a search query associated with the digital media content and extracting search concepts in the search query;
based on traversing the knowledge graph structure according to at least one of spatial and temporal criterion mapped from the search query, composing new digital media content meeting the search query, the new digital media content composed by finding concept nodes among the plurality of concept nodes, which match a concept specified in the search query, and chaining the matched concept nodes based on the at least one of spatial and temporal criterion mapped from the search query, wherein each of the concept nodes is associated with a fragment of the digital media content, wherein the new digital media content includes sequences of events associated with the concept specified in the search query occurring in the digital media content,
wherein the traversing of the knowledge graph structure includes searching for subgraphs in the knowledge graph structure having concept nodes associated with the search concepts, and the composing of the new digital media content further includes selecting from a plurality of the chained matched concept nodes, a chain that meets the at least one of temporal and spatial criterion extracted from the search query.

2. The method of claim 1, wherein the knowledge graph further includes a content node representing the digital media content, and a plurality of anchors representing time, wherein the content node and a concept node of the plurality of concept nodes are connected via an anchor.

3. The method of claim 1, wherein the knowledge graph further includes a content node representing the digital media content, and a plurality of anchors representing spatial information in the digital media content, wherein the content node and a concept node of the plurality of concept nodes are connected via an anchor.

4. The method of claim 1, wherein the information is extracted by a machine learning model that classifies labels corresponding to a plurality of fragments of the digital media content, wherein a concept associated with a fragment is determined based on at least one label.

5. The method of claim 2, wherein the plurality of concept nodes of the knowledge graph structure is traversed to find concept nodes that match a concept specified in the search query and the matched concept nodes are chained based on a temporal criterion mapped from the search query, wherein the new digital media content is composed based on digital media content fragments associated with chained matched concept nodes.

6. The method of claim 3, wherein the plurality of concept nodes of the knowledge graph structure is traversed to find concept nodes that match a concept specified in the search query and the matched concept nodes are chained based on at least a spatial criterion mapped from the search query, wherein the new digital media content is composed based on digital media content fragments associated with chained matched concept nodes.

7. The method of claim 1, further including presenting the knowledge graph structure to a user and allowing the user to edit the knowledge graph.

8. The method of claim 1, further including automatically playing the new digital media content on a user interface.

9. A system comprising:
a processor; and
a memory device coupled with the processor;
the processor configured to at least:
extract information from digital media content by performing semantic analysis wherein a plurality of semantic concepts is extracted from the digital media content;
based on the information, structure at least one of spatial and temporal representation of the digital media content in a knowledge graph structure, the knowledge graph including at least a plurality of concept nodes representing a corresponding plurality of concepts in the digital media content;
receive a search query associated with the digital media content and extract search concepts in the search query;
based on traversing the knowledge graph structure according to at least one of spatial and temporal criterion mapped from the search query, compose new digital media content meeting the search query, the new digital media content composed by finding concept nodes among the plurality of concept nodes, which match a concept specified in the search query, and chaining the matched concept nodes based on the at least one of spatial and temporal criterion mapped from the search query, wherein each of the concept nodes is associated with a fragment of the digital media content, wherein the new digital media content includes sequences of events associated with the concept specified in the search query occurring in the digital media content,
wherein the traversing of the knowledge graph structure includes searching for subgraphs in the knowledge graph structure having concept nodes associated with the search concepts, and composing of the new digital media content further selects from a plurality of the chained matched concept nodes, a chain that meets the at least one of temporal and spatial criterion extracted from the search query.

10. The system of claim 9, wherein the knowledge graph further includes a content node representing the digital media content, and a plurality of anchors representing time, wherein the content node and a concept node of the plurality of concept nodes are connected via an anchor.

11. The system of claim 9, wherein the knowledge graph further includes a content node representing the digital media content, and a plurality of anchors representing spatial information in the digital media content, wherein the content node and a concept node of the plurality of concept nodes are connected via an anchor.

12. The system of claim 9, wherein the information is extracted by a machine learning model that classifies labels corresponding to a plurality of fragments of the digital media content, wherein a concept associated with a fragment is determined based on at least one label.

13. The system of claim 10, wherein the plurality of concept nodes of the knowledge graph structure is traversed to find concept nodes that match a concept specified in the search query and the matched concept nodes are chained based on a temporal criterion mapped from the search query, wherein the new digital media content is composed based on digital media content fragments associated with chained matched concept nodes.

14. The system of claim 11, wherein the plurality of concept nodes of the knowledge graph structure is traversed to find concept nodes that match a concept specified in the search query and the matched concept nodes are chained based on at least a spatial criterion mapped from the search query, wherein the new digital media content is composed based on digital media content fragments associated with chained matched concept nodes.

15. The system of claim 9, wherein the processor is further configured to present the knowledge graph structure to a user and allowing the user to edit the knowledge graph.

16. The system of claim 9, further wherein the processor is further configured to automatically play the new digital media content on a user interface.

17. A computer program product comprising a non-transitory computer readable storage medium having program instructions embodied therewith, the program instructions readable by a device to cause the device to:
   extract information from digital media content by performing semantic analysis wherein a plurality of semantic concepts is extracted from the digital media content;
   based on the information, structure at least one of spatial and temporal representation of the digital media content in a knowledge graph structure, the knowledge graph including at least a plurality of concept nodes representing a corresponding plurality of concepts in the digital media content;
   receive a search query associated with the digital media content and extract search concepts in the search query;
   based on traversing the knowledge graph structure according to at least one of spatial and temporal criterion mapped from the search query, compose new digital media content meeting the search query, the new digital media content composed by finding concept nodes among the plurality of concept nodes, which match a concept specified in the search query, and chaining the matched concept nodes based on the at least one of spatial and temporal criterion mapped from the search query, wherein each of the concept nodes is associated with a fragment of the digital media content, wherein the new digital media content includes sequences of events associated with the concept specified in the search query occurring in the digital media content,
   wherein the traversing of the knowledge graph structure includes searching for subgraphs in the knowledge graph structure having concept nodes associated with the search concepts, and composing of the new digital media content further selects from a plurality of the chained matched concept nodes, a chain that meets the at least one of temporal and spatial criterion extracted from the search query.

18. The computer program product of claim 17, wherein the knowledge graph further includes a content node representing the digital media content, and a plurality of anchors representing time, wherein the content node and a concept node of the plurality of concept nodes are connected via an anchor.

19. The computer program product of claim 17, wherein the knowledge graph further includes a content node representing the digital media content, and a plurality of anchors representing spatial information in the digital media content, wherein the content node and a concept node of the plurality of concept nodes are connected via an anchor.

20. The computer program product of claim 17, wherein the plurality of concept nodes of the knowledge graph structure is traversed to find concept nodes that match a concept specified in the search query and the matched concept nodes are chained based on a temporal criterion mapped from the search query, wherein the new digital media content is composed based on digital media content fragments associated with chained matched concept nodes.

* * * * *